US008340995B2

(12) United States Patent
Flaxer et al.

(10) Patent No.: US 8,340,995 B2
(45) Date of Patent: *Dec. 25, 2012

(54) METHOD AND SYSTEM OF USING ARTIFACTS TO IDENTIFY ELEMENTS OF A COMPONENT BUSINESS MODEL

(75) Inventors: David Bernard Flaxer, Dobbs Ferry, NY (US); Anil Nigam, Stamford, CT (US); Guy Jonathan James Rackham, New York, NY (US); John George Vergo, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 888 days.

This patent is subject to a terminal disclaimer.

(21) Appl. No.: 12/058,320

(22) Filed: Mar. 28, 2008

(65) Prior Publication Data

US 2008/0208661 A1 Aug. 28, 2008

Related U.S. Application Data

(63) Continuation of application No. 11/328,919, filed on Jan. 10, 2006, now Pat. No. 7,574,379.

(51) Int. Cl.
*G06Q 10/00* (2012.01)
(52) U.S. Cl. ............. 705/7.11; 705/7.13; 705/7.27; 705/7.36; 705/26.81
(58) Field of Classification Search ............ 705/1, 7.11, 705/7.13, 7.27, 7.36, 26.1, 500; 707/1, 999.101
See application file for complete search history.

(56) References Cited

U.S. PATENT DOCUMENTS

| 6,662,355 | B1* | 12/2003 | Caswell et al. ............... 717/103 |
| 6,774,911 | B2* | 8/2004 | Hodgson et al. ............... 345/619 |
| 2003/0079200 | A1* | 4/2003 | Leymann et al. ............. 717/104 |
| 2007/0021993 | A1* | 1/2007 | Chandra et al. ................... 705/7 |
| 2008/0189644 | A1* | 8/2008 | Chang et al. .................. 715/772 |

* cited by examiner

*Primary Examiner* — Yogesh C Garg
(74) *Attorney, Agent, or Firm* — Whitham, Curtis, Christofferson & Cook, P.C.; Daniel P. Morris

(57) ABSTRACT

A method and system are described for using business artifacts to identify elements of a component business model. Artifacts operated upon by the business are first identified, and then used to analyze the business into business operations. This is done by identifying every business activity that acts on an artifact, creating directed graphs for the business activities, and decomposing the directed graphs into sub-graphs, each sub-graph representing a business operation and being annotated by a verb expression, the annotated sub-graph representing a business service. The business services are then clustered into non-overlapping components, using common affinities reflected in the verb expressions, and organized by partitioning into internal and external operations, exposing a business service for each external operation. The components are then clustered into non-overlapping business competencies, and arranged by accountability level.

15 Claims, 13 Drawing Sheets

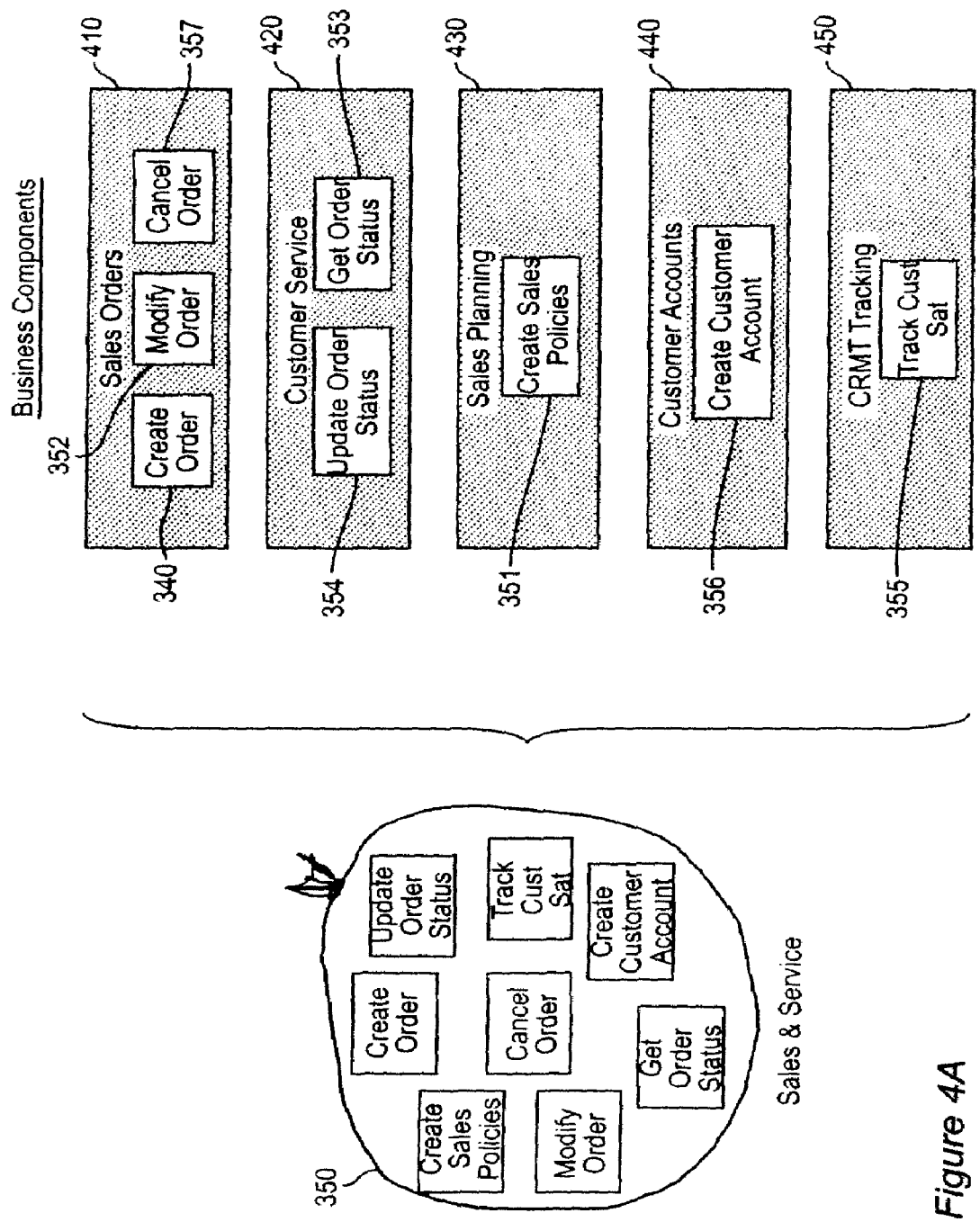

METHOD AND SYSTEM OF USING ARTIFACTS TO IDENTIFY ELEMENTS OF A COMPONENT BUSINESS MODEL

This application is a continuation of U.S. patent application Ser. No. 11/328,919, filed Jan. 10, 2006, now issued as U.S. Pat. No. 7,574,379, and which is incorporated herein by reference.

BACKGROUND OF THE INVENTION

1. Field of the Invention

The present invention generally relates to component based business models and, more particularly, to techniques for using business artifacts to discover and refine elements of a component business model.

2. Background Description

Various role players within the enterprise need to understand how the business performs its operations and activities in order to effectively manage the business and to enable business transformation. Business elements that comprise a component business model are often difficult to identify, analyze and specify. This is especially so when creating a component business model without the use of any established templates or guides. Even where there are generalized industry templates, business elements that are extracted and reused from these templates need to be customized to the needs of an individual business enterprise.

What is needed is an improved methodology for identifying elements of a component business model.

SUMMARY OF THE INVENTION

An aspect of the invention is a method for identifying elements of a component business model, comprising identifying artifacts operated on by a business, using the artifacts to analyze the business into business services, clustering the business services into non-overlapping components and clustering the components into non-overlapping competencies. In another aspect of the invention, using the artifacts to analyze the business further comprises, for each identified artifact, identifying every business activity that acts on the artifact during a lifecycle of the artifact, creating a directed graph for the identified business activities, decomposing the directed graph into sub graphs, each sub graph representing a sequence of activities at a level of granularity suitable for the business, and annotating each sub graph with a verb expression, each sub graph representing a business operation and each annotated sub graph representing a business service.

In a further aspect of the invention, clustering into components further comprises clustering the business services into components and, for each said component cluster, organizing the business services into sets consolidating duplicate functions and partitioning the business services external to the component from the business services internal to the component, each external business service being exposed by the component. Another aspect of the invention further comprises arranging each component in each competency by accountability level within a component business model map. Yet another aspect of the invention further comprises rationalizing the components and competencies to insure that each established service exposed by a component is called by another component with no orphans. In a further aspect, where a component business model of the business already exists, the invention further comprises determining whether any business operation created from analysis using an artifact is new to the existing component business model and, for any business operation determined to be new and also determined to be an external operation in a component, establishing a business service exposed by the component.

BRIEF DESCRIPTION OF THE DRAWINGS

The foregoing and other objects, aspects and advantages will be better understood from the following detailed description of a preferred embodiment of the invention with reference to the drawings, in which:

FIG. 4A is a schematic diagram showing an example of formation of business components from the business services in one of the business areas identified in FIG. 3G.

FIG. 4B is a schematic diagram showing the business components identified in FIG. 4A allocated to business competencies and operational levels on a component map.

DETAILED DESCRIPTION OF A PREFERRED EMBODIMENT OF THE INVENTION

Figure 1:
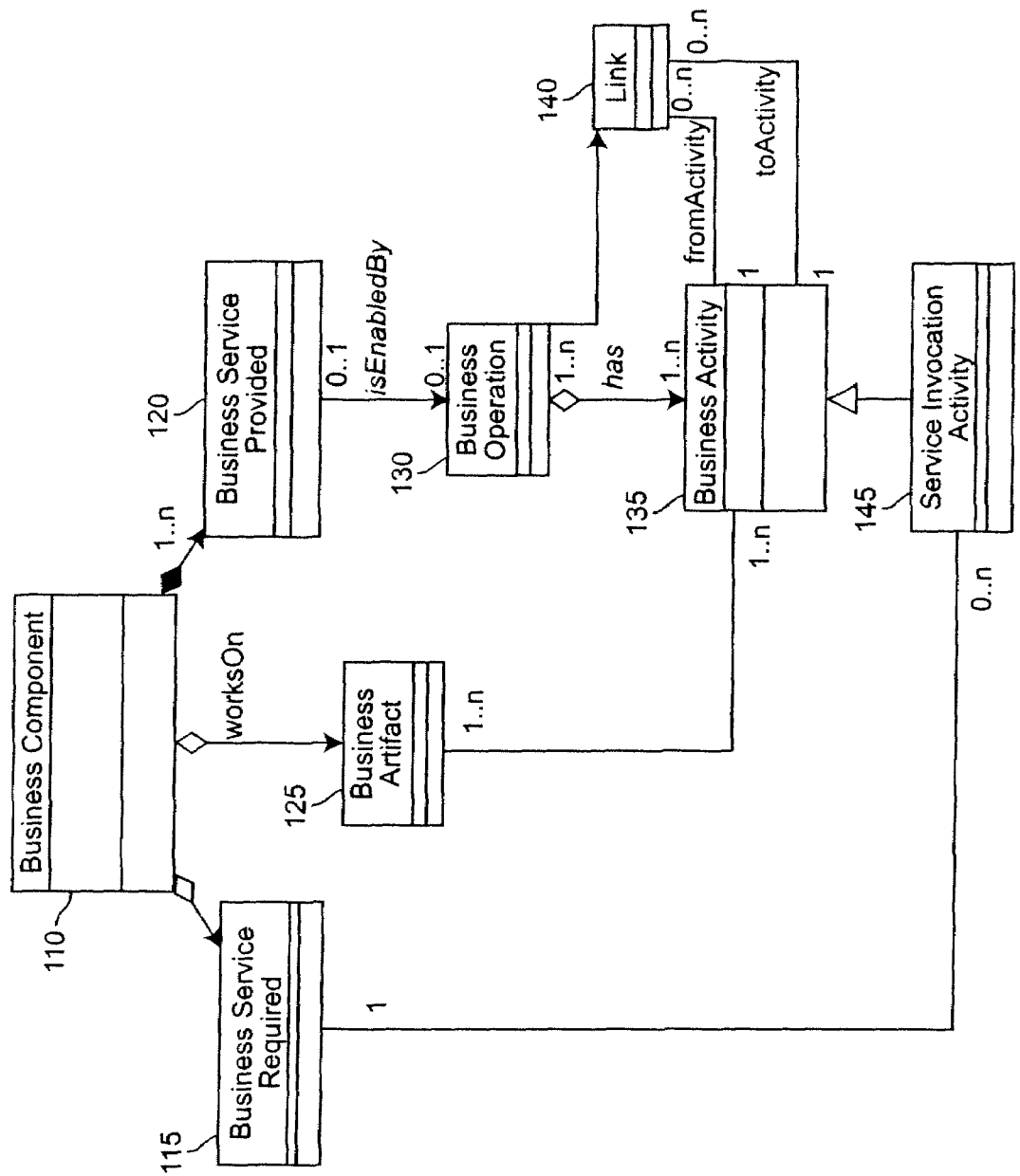
FIG. 1 shows a metamodel of a component business model (CBM).

It is therefore an object of the present invention to enable a standardized method and system for identifying elements in a component business model for representing a business enterprise. By elements we mean business components, business operations, business activities, business services and business competencies that comprise a component business model.

Another object of the invention is to provide various role players within the enterprise, including executive management, business operation teams, business analysts, IT architects, and program/project managers better ways of identifying, analyzing and specifying various elements that comprise a component business model.

A further object of the invention is to enable business transformation.

The invention uses the Component Business Model (CBM) described in related patent application Ser. No. 11/176,371 for "SYSTEM AND METHOD FOR ALIGNMENT OF AN ENTERPRISE TO A COMPONENT BUSINESS MODEL" (hereafter termed "the above referenced foundation patent application"). CBM provides a logical and comprehensive view of the enterprise, in terms that cut across commercial enterprises in general and industries in particular. The component business model as described in the above referenced foundation patent application is based upon a logical partitioning of business activities into non-overlapping managing concepts, each managing concept being active at the three levels of management accountability: providing direction to the business, controlling how the business operates, and executing the operations of the business. The term "managing concept" is specially defined as described in the above referenced foundation patent application, and is not literally a "managing concept" as that phrase would be understood in the art. For the purpose of the present invention, as for the related invention, "managing concept" is the term associated with the following aspects of the partitioning methodology. First, the methodology is a partitioning methodology. The idea is to begin with a whole and partition the whole into necessarily non-overlapping parts. Second, experience has shown that the partitioning process works best when addressed to an asset of the business. The asset can be further described by attributes. Third, the managing concept must include mechanisms for doing something commercially useful with the asset. For a sensibly defined managing concept these mechanisms must cover the full range of management accountability levels (i.e. direct, control and execute). Managing concepts are further partitioned into components, which are cohesive groups of activities. The boundaries of a component usually fall within a single management accountability level. It is important to emphasize that the boundaries between managing concepts (and between components within managing concepts) are logical rather than physical.

The method of the invention begins with an initial identification of business artifacts, items which are operated upon (e.g. by adding or modifying information content identified with the item). For each artifact, the business activities that act on the artifact are identified and a directed graph representing the life cycle of the artifact is constructed from these identified business activities. If a business activity creates or receives new artifacts not previously known, these are added to those initially identified.

Each directed graph is decomposed into sub-graphs that perform sequences of activities, each sequence being a business operation. The level of granularity of distinct business operations is chosen to be suitable for the particular business being analyzed. Each business operation is given a verb expression reflecting a business service performed by the business operation.

When all the artifacts have been processed in this fashion, the business services are clustered into 'bags' reflecting mutual affinities. These clusters are business components. The business services within a bag are then organized into sets, consolidating duplicate functions. The services within a bag are then partitioned to identify those which are internal to the business component and those which are external, i.e. those that provide services to other components or receive services from other components.

Finally, the business components are clustered into sets that contain mutual affinities. These clustered sets define business competencies. Within a competency, the business components are arranged into accountability levels within a CBM map of the business.

Referring now to the drawings, and more particularly to FIG. 1, there is shown a metamodel of a component business model (CBM). Business component 110 is a well-bounded piece of the enterprise that can be a business in its own right. It includes the resources, people, technology and know-how necessary to deliver the value the business strives to provide.

The business component 110 requires business service 115 and provides business service 120. A business service is some well-defined function that a business component offers to other business components and/or to external parties. The business component 110 works on business artifact 125. A business artifact is a concrete identifiable chunk of business information such as forms, documents and messages.

The business service 120 provided by business component 110 is enabled by business operation 130, which describes what the business actually does. The business operation 130 consists of business artifacts, business activities that work on artifacts, topology of connections between the business activities, and resources, people and technology that support the activities. Business activity 135 is something the business does at a level of granularity that is chosen by the business. It is connected in two directions to link 140, which is driven by business operation 130. Business activity 135 is expressed in a service invocation activity 145, which is a business activity that requires that a business service be invoked. Business activities may: (1) link to other business activities; (2) invoke other business operations that reside internal to the component; or (3) invoke business services that are exposed by business components. Business activity 135 is an example of the latter.

The method of the invention provides a more precise means, involving less subjectivity, for identifying CBM elements and how the business operates. Business artifacts describe, in information terms and at a business level, what the business produces or processes (e.g. a healthcare insurance enterprise might be in the business of processing written requests prepared by claimants, called "Claims"). By using business artifacts, business activities 135 can be elicited by asking the questions—"How do you recognize an artifact that you can work on?" and "What information do you add to this artifact as part of your processing?" Business activities 125 which process artifacts, and the connection topology between them, characterize business operation 130.

The method of using business artifacts to identify CBM elements results in a new, unique and innovative process to discover new CBM elements or validate and improve the definition of existing CBM elements, including business components, business operations, business activities, business services and business competencies that comprise a Component Business Model. Both business competencies and business components rely on operations that process artifacts—thus artifacts provide an effective mechanism for insights into business components and business competencies. For example, business services provided by a business component can be identified and/or rationalized in terms of the artifacts that the business component processes and maintains. A business service is in one of three categories. It may provide information that is available from artifacts in the component. It may update the information content of artifacts in the component. Finally, it may transfer the actual artifact to the requester.

The artifact method of identifying CBM elements describes two conditions where CBM elements can be identified: first, it may be used where the CBM map or CBM elements have not previously been identified; second, it may be used where the structure of the CBM and the CBM elements has been specified but requires validation and modification.

The method presented describes various steps in the technique to identify new or validate existing CBM elements. First, it establishes the lifecycle of an artifact and creates a directed graph of all the business activities that act on it. Second, it applies a technique of "cleave points" resulting in an improved way of decomposing an entire enterprise within the Component Business Model structure. The analysis of cleave points is enabled by a decomposition of directed graphs of business activities which apply to the lifecycle of the business artifact. Cleave points are a sensible decomposition or breaking up of a large directed graph into smaller business processes that are suitable in size for the business and results in the identification of business operations and business services. Finally, it applies clustering techniques to business services to discern and identify business components, and then clusters business components to identify business competencies.

A discussion on the nature of a business artifact, its lifecycle and the tasks that act on it is discussed in U.S. Pat. No. 6,662,355 to Caswell et al. By following the artifact lifecycle we identify all the business activities that act on the artifact and construct a picture of the life of the artifact from cradle to grave. This is represented in the directed graph of business activities. This graph may be overwhelmingly complex and additional analysis is required to decompose the lifecycle, at appropriate cleave points, into an assemblage of chunks suitable in size for the business.

A standard for identifying a cleave point is one that locates the cleave point at a place that minimizes the transfer of data and messages between business processes, while maximizing the locality of information within the business process. Analysis of these business processes through aggregation and their subsequent re-composition is a leading indicator for business component identification and validation.

The method of using business artifacts to identify CBM elements also involves a process of clustering basic pieces of function into more complex aggregations, (e.g. a business operation is an aggregation of multiple business activities.) To accomplish this grouping a concept of "mutual affinities" is applied. By mutual affinities we mean the identification of related function, data and behavior between two or more common elements. Clustering can be accomplished through any one of several known and recognized approaches, including conceptual clustering (two or more elements belong to the same cluster if the cluster is defined by a concept common to the elements) distance-based clustering (the similarity criterion between two or more elements if they are "close" according to a metric based on the shared affinity between them), or semantic analysis of element names and their descriptions.

The behavior of the CBM Artifact Method (for example, the granularity of CBM elements) can be controlled through the specification of preferred ranges for criteria analysis. An example of this is the specification of an ideal number of components, competencies, or services that comprise a given CBM. The central notion of using business artifacts is that 'what the business actually does' can be described using artifacts. These descriptions are more easily understood by business people, especially those with operational responsibility, and also have enough information to facilitate the building of automation systems to support the business.

Figure 1A:
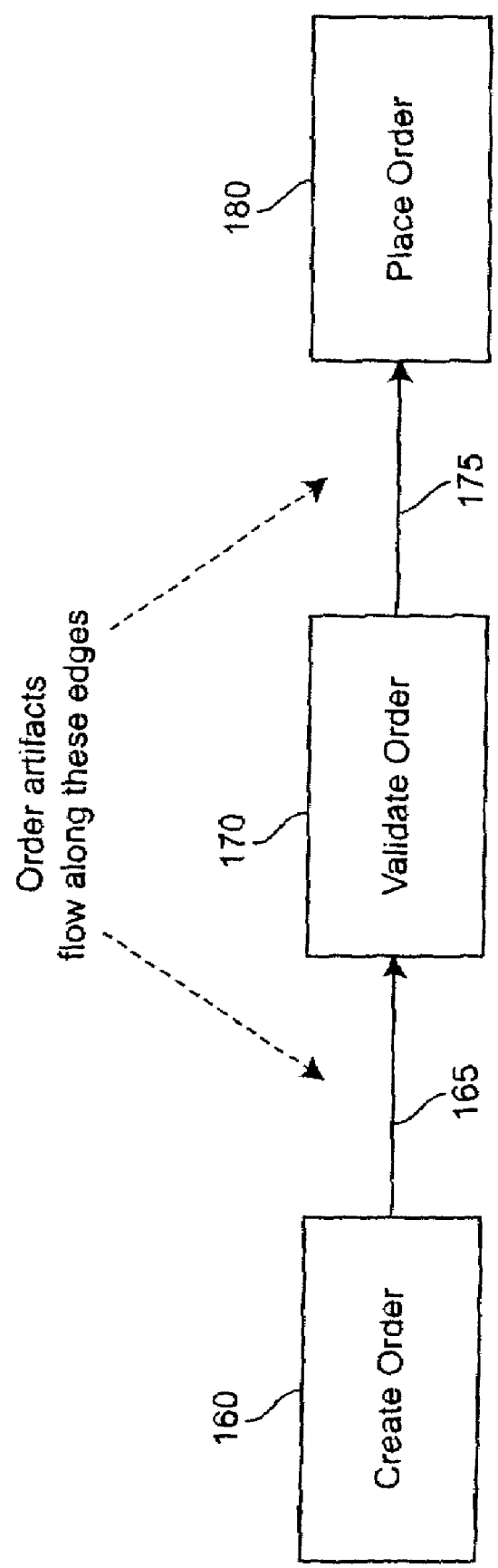
FIG. 1A shows a simple example of an artifact flowing through several business tasks.

A business artifact is a concrete and identifiable container of business information, a container that makes sense to a business person. Artifacts are discussed in U.S. Pat. No. 6,662,355 to Caswell et al., and their use is extended as described in the present invention to discover elements of component business models. Examples of an artifact are an order, a customer record, or a guest check in a restaurant. 'What a business actually does' can be described as a network of business tasks through which an artifact flows. A simple example of an order artifact flowing through three business tasks is shown in FIG. 1A. The first task is to create the order 160. The created order then moves along an edge 165 to the next task, which is to validate the order 170. The validated order then moves along an edge 175 to the next task, which is to place the order 180. The artifact approach factorizes the business information into three essential ingredients—artifacts (which contain information), business activities (which implement function), and flow (i.e. edges which define the movement of artifacts from one task to another).

A business activity is idle until an artifact arrives. The activity adds to the artifact the information that it has been trained to add and passes it on. Each business activity has enough knowledge to recognize an artifact and to process it in accordance with the requirements of the business.

Figure 2:
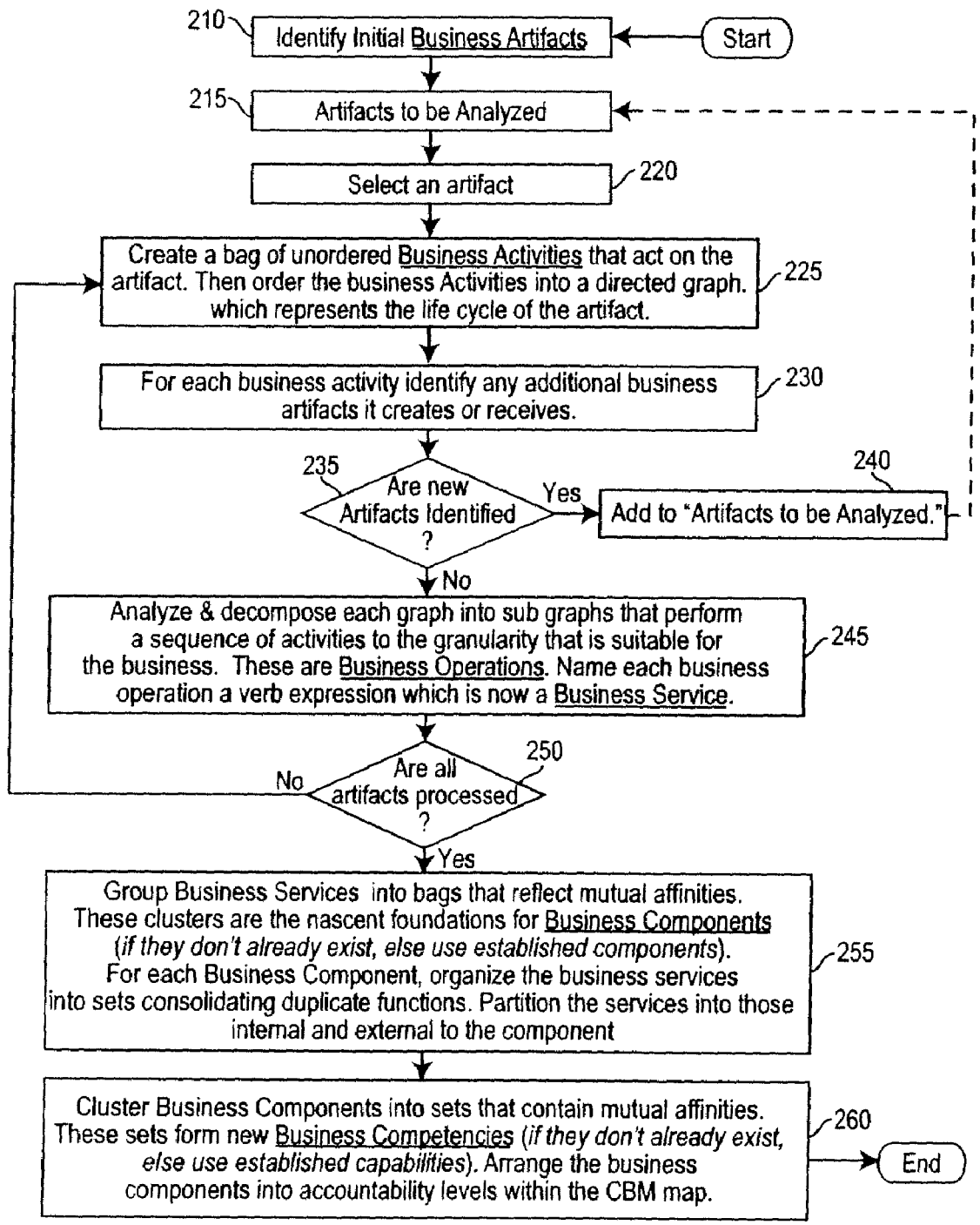
FIG. 2 is a high level flow chart showing operation of the method of the invention.
Figure 3A:
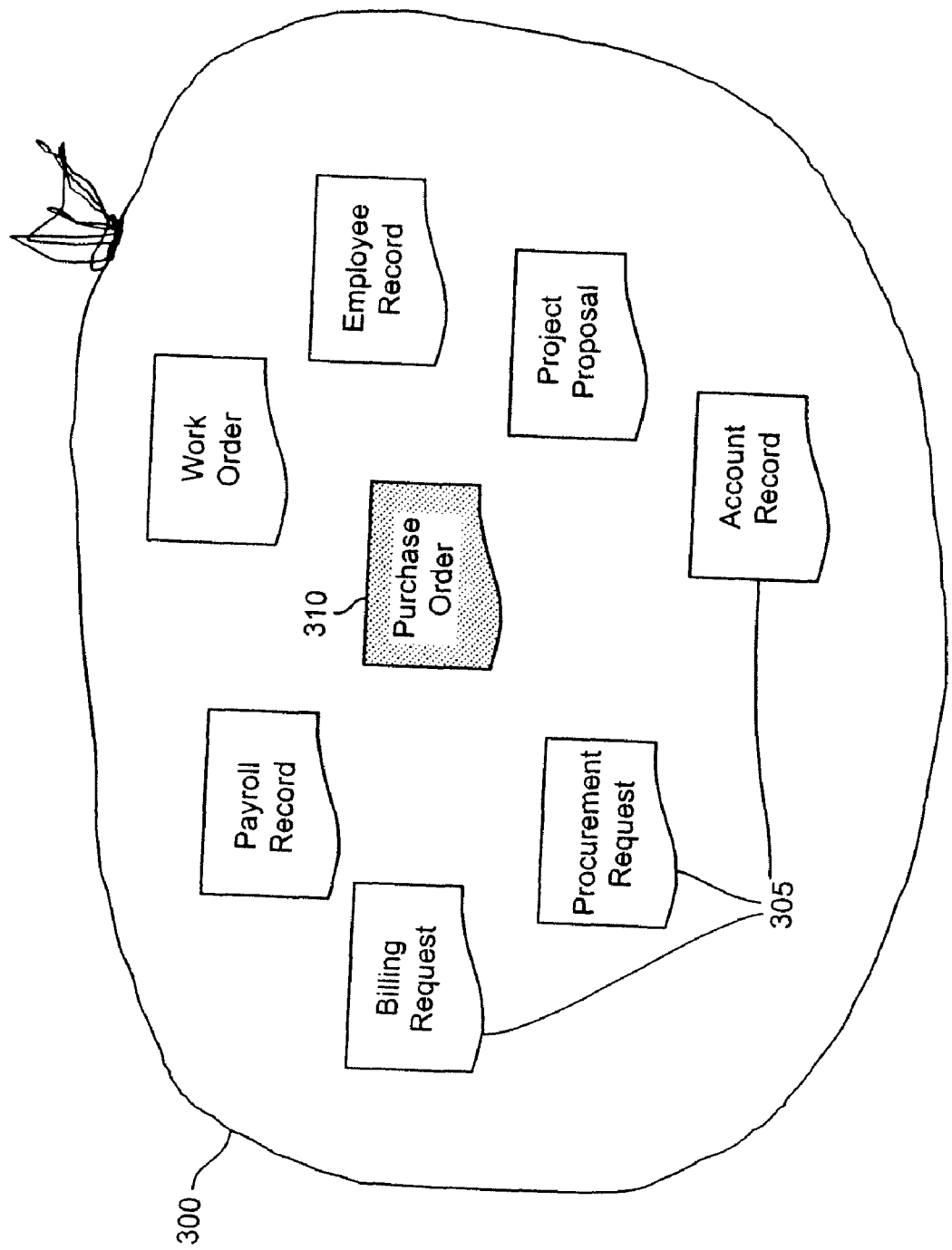
FIG. 3A is a schematic diagram showing an example of initially identified business artifacts.

Turning now to FIG. 2, there is shown a high level flow chart of the method of the invention. The method begins with an initial identification of business artifacts 210. These identified artifacts provide the initial collection of artifacts to be analyzed 215. FIG. 3A shows an example of such a collection of artifacts 305 as an unassociated unordered group of objects in "bag" 300, including a purchase order artifact 310. Analysis begins by selecting one of the collected artifacts, for example, purchase order artifact 310 shown in FIG. 3A.

Figure 3B:
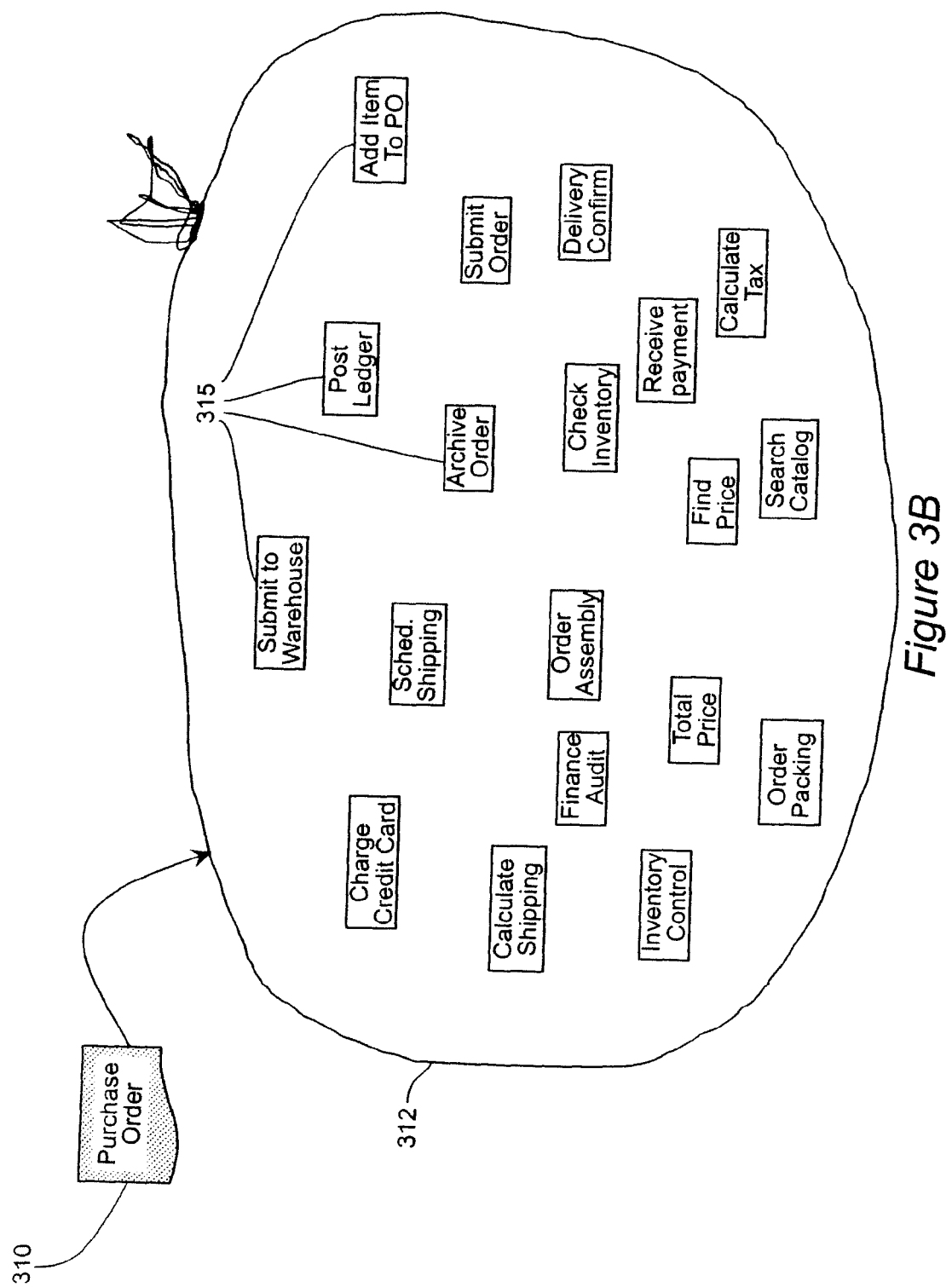
FIG. 3B is a schematic diagram showing a collection of business activities identified for a selected business artifact.
Figure 3C:
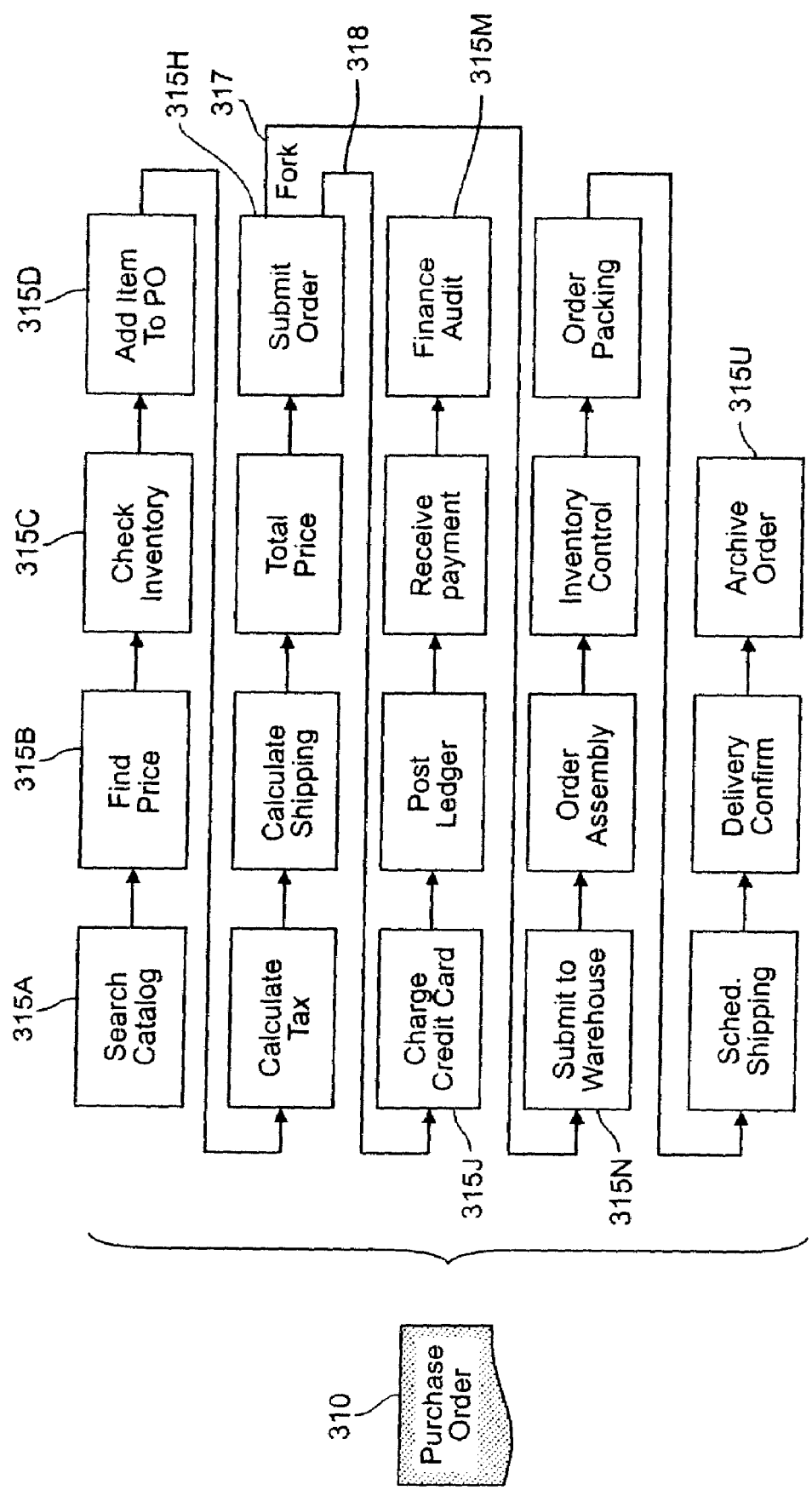
FIG. 3C is a directed graph showing a lifecycle of the business activities identified in FIG. 3B.

Then the selected artifact is used to identify the various business activities that act on the artifact and order them into a directed graph representing the life cycle of the artifact 225. This part of the analysis may be understood with reference to FIGS. 3B and 3C. As shown in FIG. 3B, purchase order artifact 310 (selected for analysis as shown in FIG. 3A) is used to collect a bag 312 of those business activities 315 that act on the purchase order artifact 310. Then these business activities are ordered into a directed graph as shown in FIG. 3C. For example, the purchase order artifact is used for searching a catalog 315A, finding a price 315B, checking inventory 315C, adding an item to the purchase order 315D, etc. Note that copying technology, coupled with controlling indicators on the artifact to later combine the copies, such as those which support data caching and data coherence, enable the directed graph for an artifact to be more complex than a linear sequence of business activities each acting in turn upon the artifact. An example of a more complex life cycle for an artifact is shown by the "fork" or branching pattern in FIG. 3C after the order submission activity 315H. One copy of the purchase order artifact 310 follows branch 318 to a sequence of business activities beginning with charge credit card 315J and continuing to finance audit 315M. Another copy of the purchase order artifact 310 follows branch 317 to a sequence of business activities beginning with submit to warehouse 315N and continuing to archive order 315U. In addition to forks, other business process composition patterns including sequence, decision, joins and synchronization are supported. It is noted that these business composition patterns may also suggest potential "cleave points". It should also be noted that copies and controlling indicators for complex directed graphs may be implemented using computerized representations of the artifacts.

Figure 3D:
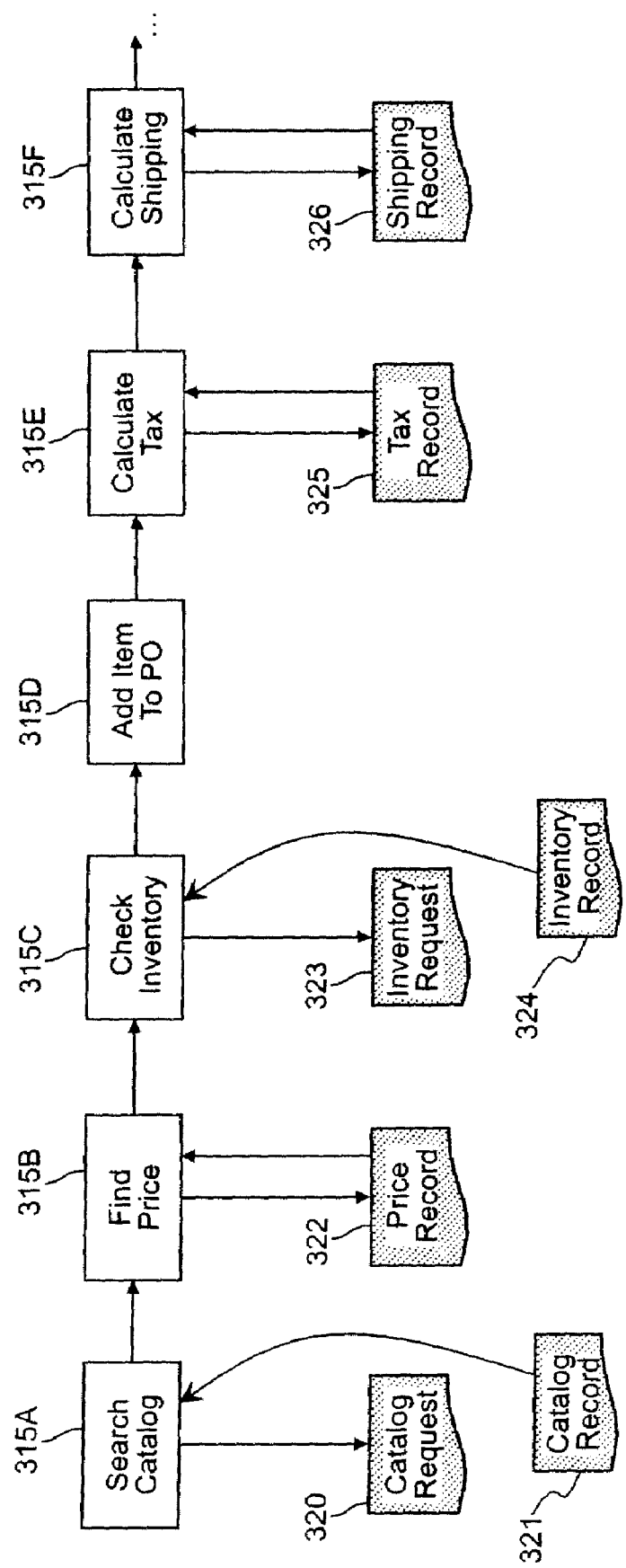
FIG. 3D is a schematic diagram showing additional business artifacts identified as associated with business activities identified in FIG. 3B.

In the course of constructing a directed graph describing the life cycle of the artifact, additional artifacts may be identified, as shown generically by item 230 in FIG. 2 and by example in FIG. 3D. It should be noted that business activities, which provide the basic units of business function, may create or receive additional business artifacts in the course of performing their functions. The purchase order artifact 310 is used to search catalog 315A, then find price 315B, check inventory 315C, add the ordered item to the purchase order 315D, calculate the tax 315E, calculate shipping charges 315F, etc. In order to search catalog 315A, a catalog request artifact 320 is created and a responsive catalog record 321 is also created. When using the purchase order artifact 310 to find price 315B, a price record artifact 322 is consulted. Similarly, when checking inventory 315C, an inventory request artifact 323 is generated, and an inventory record artifact 324 is returned in response. In order to calculate tax 315E a tax record artifact 325 is consulted. Similarly, to calculate shipping charges 315F a shipping record artifact 326 is consulted.

At this point in the analysis the identified artifacts (e.g. catalog request 320 through shipping record 326) are evaluated to determine whether any new artifacts have been identified 235, and if so the new artifacts are added 240 to the collection of artifacts to be analyzed 215, as shown by the dotted line in FIG. 2. Proceeding in an exhaustive and detailed manner, the business activities that the business performs will be identified. It is asserted, by not proven in this patent, that this process results in the complete coverage and identification of all business activities within the enterprise. A corollary to this assertion, also not proven in this patent, is that all work performed by the business is represented or attributable to the business artifacts it produces.

Figure 3E:
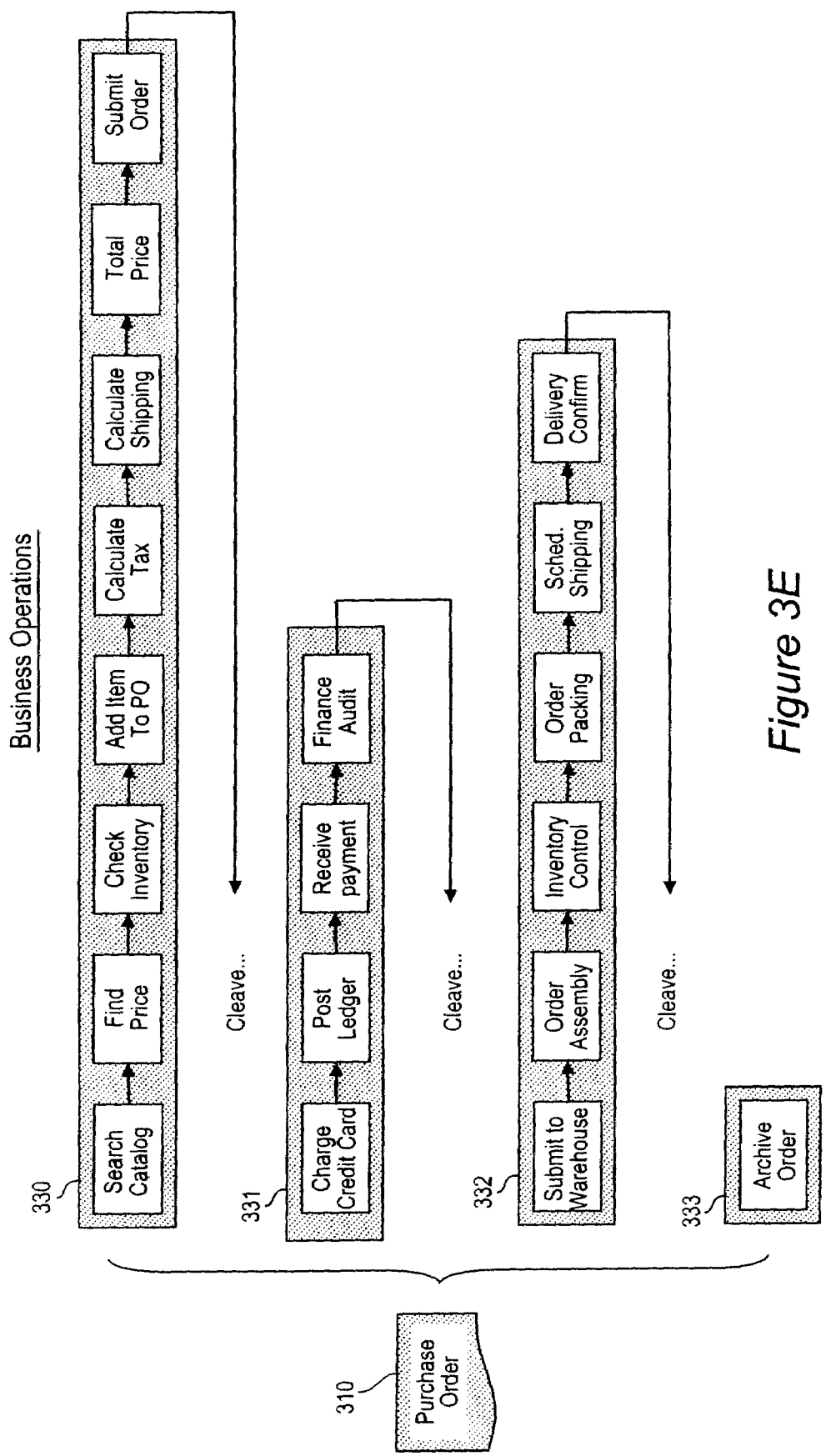
FIG. 3E is a directed graph modified to separate business operations at cleave points.
Figure 3F:
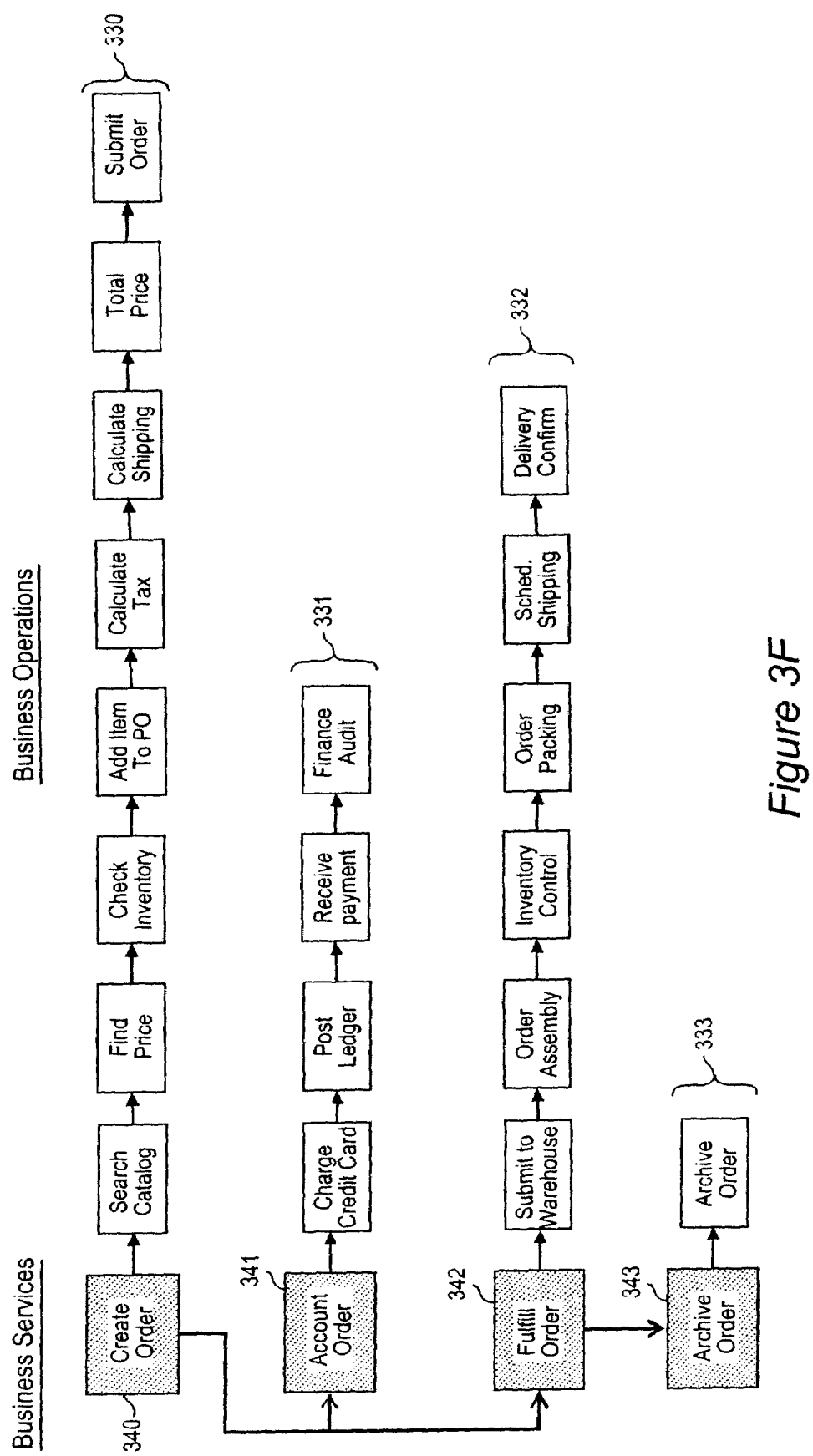
FIG. 3F is a directed graph as in FIG. 3E further modified to define a business service for each business operation.

Continuing with FIG. 2, the next step in the method is to decompose the directed graph into sub-graphs representing a sequence of business activities at a level of granularity suitable for the business 245. An example is shown in FIG. 3E, where the directed graph constructed for the business activities 315 acting on purchase order artifact 310 is decomposed into four business operations (310, 331, 332 and 333), which are identified by appropriate verb expressions as business services create order 340 (corresponding to business operation 330), account order 341 (corresponding to business operation 331), fulfill order 342 (corresponding to business operation 332), and archive order 343 (corresponding to business operation 333), as shown in FIG. 3F.

The foregoing steps (items 220 through 245 in FIG. 2) are repeated 250 until all artifacts have been analyzed. We are now at the point in the method in which business components and business competencies can be identified. Through the process of clustering business services based on mutual affinities, we establish focal points of related business service within the enterprise. These "service centers" present natural boundaries among chunks of the business and forms discrete parts with specialist capabilities which when aggregated together covers the entire enterprise. As noted in foundation patent application, these discrete, non-overlapping parts are called business components. The artifact method presents a technique to identify business components through the decomposition of the artifact lifecycle into business services, and the subsequent aggregation of services into business components. Likewise, the artifact method describes a technique to identify "management concepts", also cited in the foundation patent, through the process of clustering business components into business competencies.

Figure 3G:
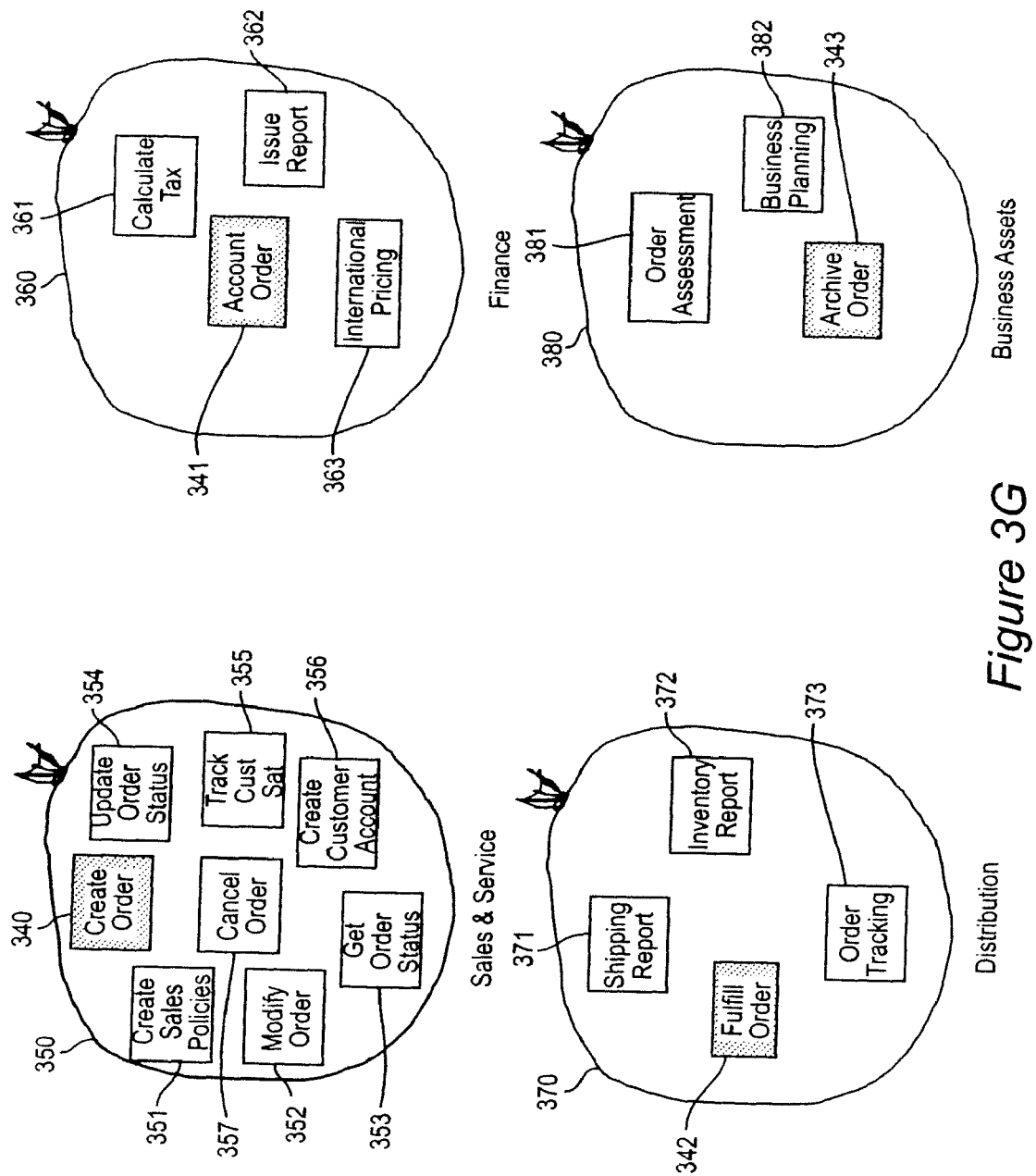
FIG. 3G is a schematic diagram showing an example of business services sharing mutual affinities being clustered into business areas.

The business services that have been identified are grouped into bags that reflect mutual affinities 255. It may be that many business services may have been identified which may make clustering directly into business components difficult. To ameliorate this problem an intermediate clustering is proposed which is illustrated in FIG. 3G. This intermediate clustering is based on the concept of "major categories" (discussed in the foundation patent application) that are designed to cover all types of business activity in all industries. These major categories represent broad generic functions that businesses possess, and include: business assets, business development, constituents, finance, distribution, sales & services, production, and production management.

An example of intermediate clustering based on major categories is shown in FIG. 3G, which shows a sales and service bag 350, a finance bag 360, a distribution bag 370 and a business assets bag 380. It will be noted that each of the business services identified in FIG. 3F have been grouped with related business services in FIG. 3G, which also contains additional services discovered from an analysis of other artifacts. The create order 340 business service has been grouped with create sales policies 351, modify order 352, get order status 353, update order status 354, track customer satisfaction 355, create customer account 356, and cancel order 357. This grouping reflects the "sales and service" 350 affinity common to these business services.

Similarly, the account order 341 business service has been grouped with calculate tax 361, issue report 362 and international pricing 363 under the common affinity "finance" 360. Fulfill order 342 business service has been grouped with shipping report 371, inventory report 372 and order tracking 373 under the common affinity "distribution" 370. And archive order 343 business service has been grouped with order assessment 381 and business planning 382 under the common affinity "business assets" 380.

The clusters of business services having mutual affinities are the nascent foundations for business components. These bags of business services are further refined using clustering to more narrow and specialized mutual affinity criteria that generate business components suitable in size and character to the nature of the business. These refined mutual affinity clusters reflect a partitioning that meets the definition of a "business component" described in the above referenced foundation patent application. That is, each refined affinity cluster reflects a business component that enables a center of related business services activities, which are non-overlapping. The business services within a cluster are organized into cohesive groups of activities, which are the business components of the CBM model. For each component, the business services are organized to consolidate duplicate functions and eliminate overextensions. An example of organizing business services of an affinity cluster into components is shown in FIG. 4A. A business component sales order 410 includes the business services of create order 340, modify order 352, and cancel order 357. Similarly, a business component customer service 420 includes the business services of get order status 353 and update order status 354. The remaining three business services create sales policies 351, create customer account 356 and track customer satisfaction 355 are included in business component sales planning 430, customer accounts 440 and Customer Relationship Management (CRM) tracking 450, respectively. It should be noted that these components may already have been established in a CBM map, in which case the identified business services are used to verify or add to the existing model, and in any event components may include other services besides those identified by the artifact methodology of the present invention.

Returning to FIG. 2, in order to complete either creation of a CBM model or updating of an existing CBM model, the business competencies need to be identified. This is done by clustering the business components thus far identified by the artifact methodology into "affinity clusters" using affinity criteria that reveal managing concepts, and then placing them into a suitable accountability level. These mutual affinity clusters reflect a partitioning that meets the definition of "business competency" described in the above referenced foundation patent application. That is, each affinity cluster reflects a managing concept (or a combination of managing concepts) of related business activities and the clusters are non-overlapping.

As shown in FIG. 4B, the sales planning component 430 is in the direct 481 accountability level, the CRM tracking component 450 is in the control 482 accountability level, and the remaining components are in the execute 483 accountability level. Note that FIG. 4B shows the business components clustered under intermediate "major category" called "sales and service" have now been assigned to more refined business competencies called "selling" 471 and "servicing" 472. (Note that in this example the names of the business competencies are coincident with the name of the major category.) The sales planning component 430 and the sales orders component 410 are organized under selling 471, while the CRC tracking 450, customer service 420 and customer accounts 440 components are organized under servicing 472. Depending upon the particular business involved, size and other factors, separate competencies may be appropriate for selling 471 and servicing 472, or it may be more appropriate to merge the selling 471 and servicing 472 managing concepts into a "sales and service" competency 473.

Figure 5A:
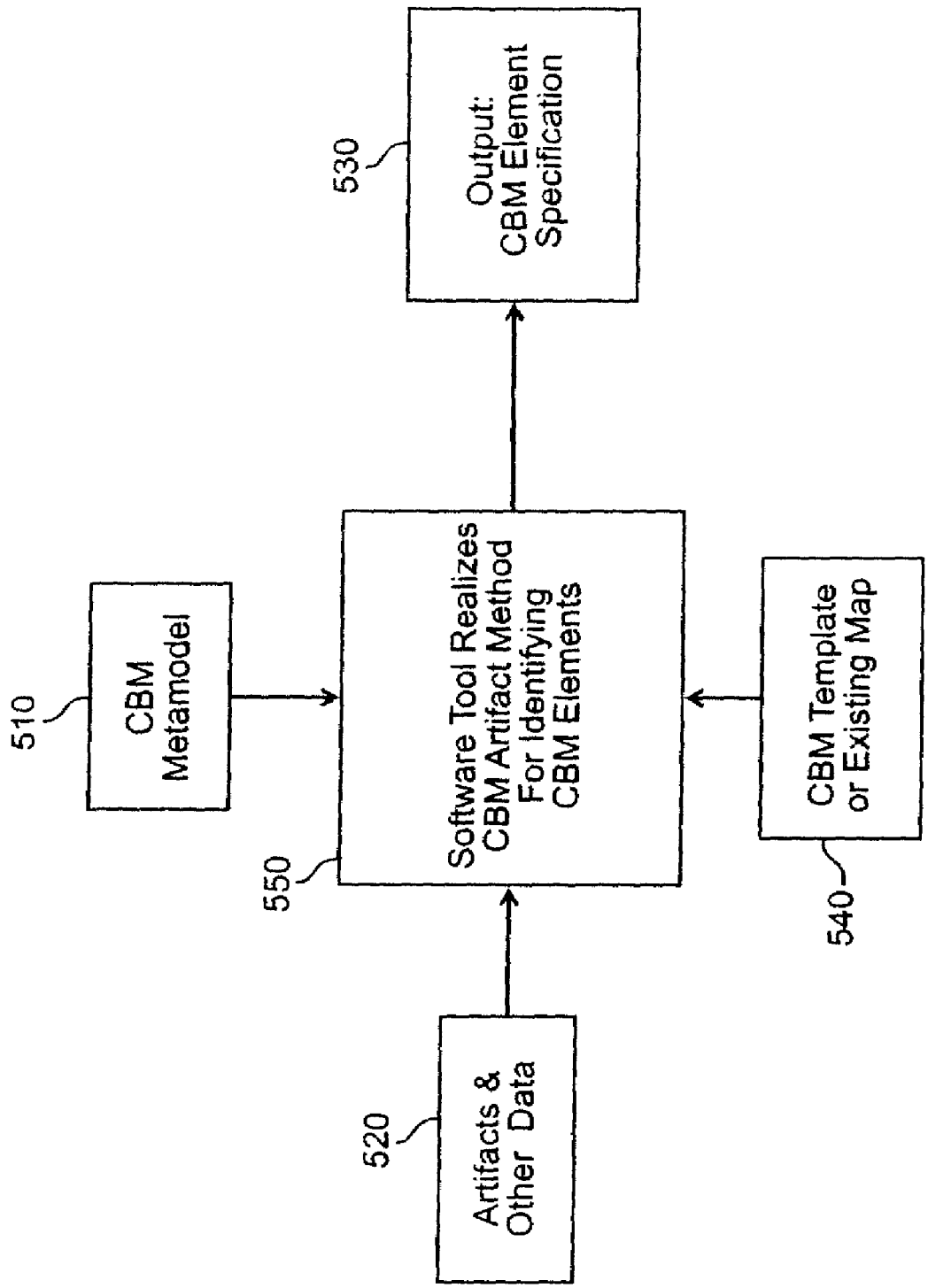
FIG. 5A is a schematic diagram showing a high level view of how the invention uses artifacts to specify CBM elements.

The main elements of the preferred embodiment of the invention may be summarized with reference to FIG. 5A. Business artifacts 520 comprise the set of the identifiable chunks of business information that must be identified, and which then serve as the inputs for a CBM artifact method tool 550 implementing the invention. As described in the CBM artifact method tool 550, business artifacts 520 provide the starting place for identifying all CBM business elements 530. The other inputs to the tool 550 are the CBM metamodel 510, which specifies all CBM elements and their relationship to one another, and, optionally, an existing CBM map 540 (or a CBM template that needs to be customized for a given business, where there is no existing CBM map for the business). Should neither a CBM template or existing CBM map 540 be available, the tool will use the artifact analysis to identify and create CBM elements for the business.

The tool 550 for realizing the artifact method can support an interactive user interface or an automated program that follows the CBM artifact method described above to produce a new or modified component business model for the business. The output 530 of the tool 550 is a valid and verified specification of the component business model for a business, including all CBM elements. The output 530 may represent a report, a file of structured information or a presentation on an end user interface.

Figure 5B:
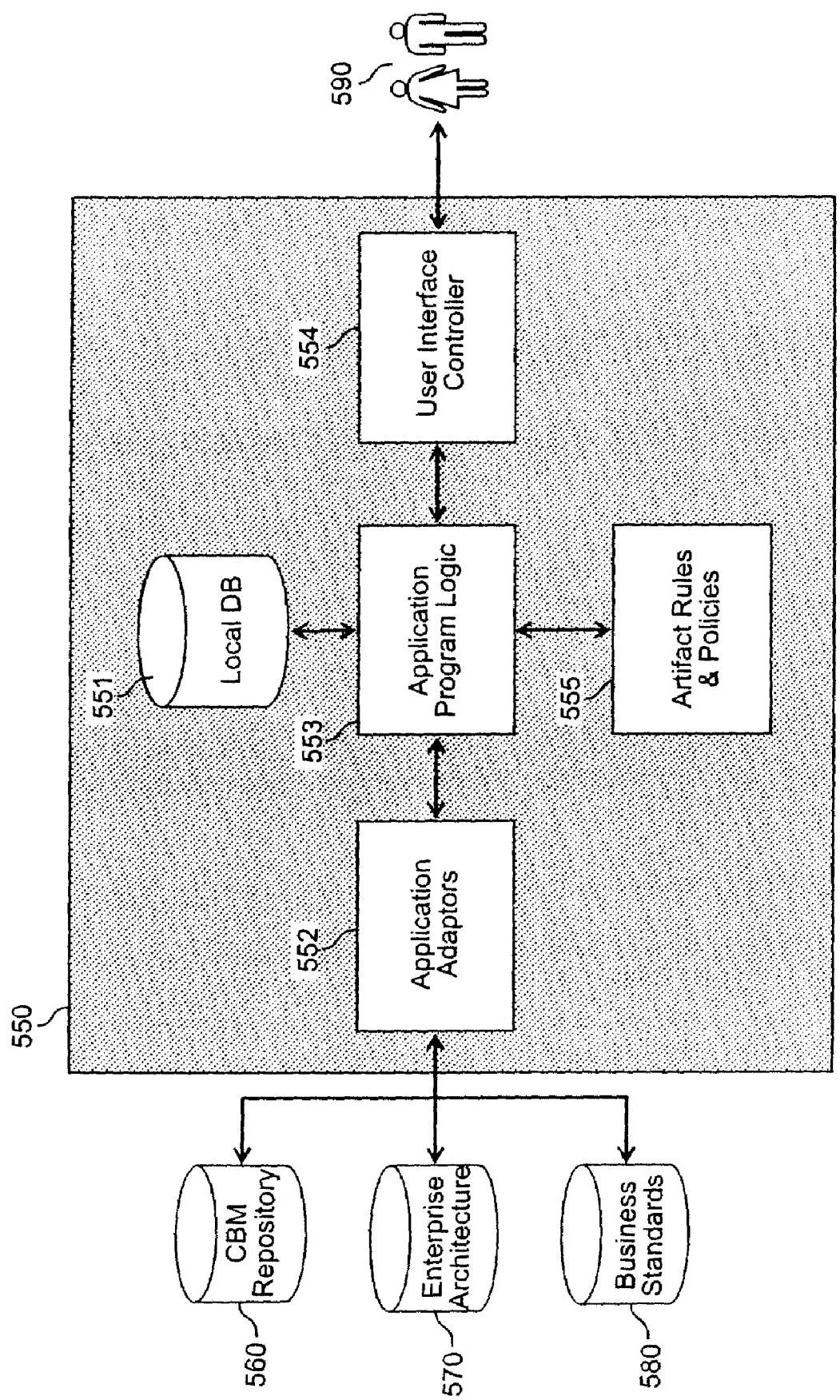
FIG. 5B is a more detailed schematic diagram of a software tool shown in FIG. 5A for using artifacts to identify CBM elements.

FIG. 5B provides a more detailed view of software tool 550. Application logic program 555 interacts with artifact rules and policies 555 and uses a local database 551 for storage. Information in CBM repository 560, enterprise architecture application 570 and business standards application 580 are provided to application program logic 553 through application adaptors 552. Application program logic 553 is accessed and controlled by users 590 through a user interface controller 554.

While the invention has been described in terms of a single preferred embodiment, those skilled in the art will recognize that the invention can be practiced with modification within the spirit and scope of the appended claims.

The invention claimed is:

1. A method for identifying elements of a component business model, comprising:
   identifying the business artifacts operated on by a business, wherein a business artifact is a concrete identifiable chunk of business information comprising forms, documents and/or messages, and is a concrete and identifiable container of business information wherein the container makes sense to a businessperson;
   using the business artifacts from the identifying step, processing the business into business services, wherein a business service is represented by an annotated sub-graph, annotated with a verb expression, and is some well-defined function that a business component offers to other business components and/or to external parties;
   clustering the business services into asset based non-overlapping components;
   clustering the components into non-overlapping competencies,
   wherein using the business artifacts to analyze the business further comprises, for each identified business artifact:
      identifying every business activity that acts on the business artifact during a lifecycle of the business artifact;
      creating a directed graph for the identified business activities;
      identifying one or more cleave points for decomposing the directed graph into sub graphs, each sub graph representing a sequence of activities at a level of granularity suitable for the business, each said cleave point being located at a place that minimizes transfer of data and messages between business processes while maximizing the locality of information within the business process;
      decomposing the directed graph into sub-graphs at each of said one or more cleave points;
      annotating each sub graph with a verb expression, each sub graph representing a business operation and each annotated sub graph representing a business service; and
   wherein the above-recited method steps are performed by a computer.

2. The method of claim 1, wherein clustering into components further comprises:
   clustering said business services into components;
   for each said component cluster, organizing the business services into sets consolidating duplicate functions and partitioning the business services external to the component from the business services internal to the component, each external business service being exposed by the component.

3. The method of claim 2, further comprising:
   rationalizing the components and competencies to insure that each established service exposed by a component is called by another component with no orphans.

4. The method of claim 1, further comprising:
   arranging each component in each said competency by accountability level within a component business model map.

5. The method of claim 1, further comprising:
   rationalizing the components and competencies with respect to processes of the business, to insure that all the processes of the business are covered by the components and competencies.

6. The method of claim 1, wherein a component business model of the business already exists, further comprising determining whether any business operation created from analysis using an artifact is new to the existing component business model, and for any business operation determined to be new and also determined to be an external operation in a 6 component establishing a business service exposed by the component.

7. The method of claim 1, wherein the business 2 services comprise one or more selected from the group consisting of:
   a business service that provides information that is available from business artifacts in the component;
   a business service that updates information content of artifacts in the component; and
   a business service that transfers the business 6 artifact to a requester.

8. Implementing a service for identifying elements of a component business model, comprising the method of:
- identifying business artifacts operated on by a business, wherein a business artifact is a concrete identifiable chunk of business information comprising forms, documents and/or messages;
- using the business artifacts from the identifying step, processing the business into business services, wherein a business service is represented by an annotated sub-graph, annotated with a verb expression, and is some well-defined function that a business component offers to other business components and/or to external parties;
- clustering the business services into asset based non-overlapping components; and
- clustering the components into non-overlapping competencies,
- wherein using the business artifacts to analyze the business further comprises, for each identified business artifact:
  - identifying every business activity that acts on the business artifact during a lifecycle of the business artifact;
  - creating a directed graph for the identified business activities;
  - identifying one or more cleave points for decomposing the directed graph into sub graphs, each sub graph representing a sequence of activities at a level of granularity suitable for the business, each said cleave point being located at a place that minimizes transfer of data and messages between business processes while maximizing the locality of information within the business process;
  - decomposing the directed graph into sub-graphs at each of said one or more cleave points;
  - annotating each sub graph with a verb expression, each sub graph representing a business operation and each annotated sub graph representing a business service; and wherein the above recited method steps are performed by a computer.

9. A method implementing a service as in claim 8 wherein clustering into components further comprises:
- clustering said business services into components;
- for each said component cluster, organizing the business services into sets consolidating duplicate functions and partitioning the business services external to the component from the business services internal to the component, each external business service being exposed by the component.

10. A method implementing a service as in claim 9, further comprising:
- rationalizing the components and competencies to insure that each established service exposed by a component is called by another component with no orphans.

11. A method implementing a service as in claim 8, further comprising:
- arranging each component in each said competency by accountability level within a component business model map.

12. A method implementing a service as in claim 8, further comprising:
- rationalizing the components and competencies with respect to processes of the business, to insure that all the processes of the business are covered by the components and competencies.

13. A method implementing a service as in claim 8, wherein a component business model of the business model already exists, further comprising determining whether any business operation created from analysis using an artifact is new to the existing component business model, and for any business operation determined to be new and also determined to be an external operation in a component establishing a business service exposed by the component.

14. A computer implemented system for identifying elements of a component business model, comprising a processor and a memory wherein the memory coupled to the processor stores a plurality of program codes which when executed by the processor executes the following steps:
- first computer code identifying business artifacts operated on by a business, wherein a business artifact is a concrete identifiable chunk of business information comprising forms, documents and/or messages, and is a concrete and identifiable container of business information wherein the container makes sense to a businessperson;
- second computer code using the business artifacts that have been identified to analyze the business into business services, wherein a business service is represented by an annotated sub-graph, annotated with a verb expression, and is some well-defined function that a business component offers to other business components and/or to external parties;
- third computer code clustering the business services into asset based non-overlapping components; and
- fourth computer code clustering the components into non-overlapping competencies
- wherein the second computer code using the business artifacts to analyze the business further comprises for each identified business artifact:
- fifth computer code identifying every business activity that acts on the business artifact during a lifecycle of the business artifact;
- sixth computer code creating a directed graph for the identified business activities;
- seventh computer code identifying one or more cleave points for decomposing the directed graph into sub graphs, each sub graph representing a sequence of activities at a level of granularity suitable for the business, each said cleave point being located at a place that minimizes transfer of data and messages between business processes while maximizing the locality of information within the business process;
- tenth computer code decomposing the directed graph into sub-graphs at each of said one or more cleave points;
- eighth computer code annotating each sub graph with a verb expression, each sub graph representing a business operation and each annotated sub graph representing a business service.

15. The computer implemented system of claim 14 wherein the third computer code for clustering into components further comprises:
- ninth computer code for clustering said business services into components;
- for each said component cluster, tenth computer code for organizing the business services into sets consolidating duplicate functions and eleventh computer code for partitioning the business services external to the component from the business services internal to the component, each external business service being exposed by the component.

* * * * *